United States Patent [19]

Norton

[11] 4,003,301
[45] Jan. 18, 1977

[54] VACUUM RELIEF SYSTEM FOR TARPAULIN COVERED HOPPER TRAILERS

[75] Inventor: Morrison Kai Norton, Woodland, Calif.

[73] Assignee: Titan Trailer Corporation, Woodland, Calif.

[22] Filed: Nov. 10, 1975

[21] Appl. No.: 630,336

[52] U.S. Cl. .................................... 98/13; 98/6; 98/53; 105/248; 105/377; 302/53; 298/27; 298/28

[51] Int. Cl.² ........................................ B61D 7/32

[58] Field of Search ............ 98/6, 8, 10, 13, 52–56; 105/248, 377; 296/15, 39; 298/27–29; 302/53, 62

[56] References Cited

UNITED STATES PATENTS

| | | | |
|---|---|---|---|
| 3,092,007 | 6/1963 | Boyd ........................................ | 98/6 |
| 3,194,144 | 7/1965 | Linden et al. ........................... | 105/248 |
| 3,326,111 | 6/1967 | Stevens .................................... | 98/6 |
| 3,330,225 | 7/1967 | Barry ....................................... | 105/377 |
| 3,611,905 | 10/1971 | Brinks ..................................... | 98/13 |
| 3,627,384 | 12/1971 | Rollins .................................... | 302/53 |
| 3,731,053 | 5/1973 | Coyle et al. ............................. | 98/6 |

Primary Examiner—John J. Camby
Assistant Examiner—Henry C. Yuen
Attorney, Agent, or Firm—Lothrop & West

[57] ABSTRACT

An elongated hollow tube extending between the forward and after ends of a hopper trailer serves as a ridge pole for a protective tarpaulin covering a commodity, such as rice or wheat, forming the trailer's cargo.

Conduits connected to the ends of the tube extend downwardly below the margin of the tarpaulin so as to conduct atmospheric air into the tube. From the tube the air discharges downwardly through an opening in the tube vertically above the hopper door and thereby equalizes the air pressures on both sides of the tarpaulin as the commodity is withdrawn from the hopper and tends to form a "vacuum" beneath the tarpaulin.

10 Claims, 10 Drawing Figures

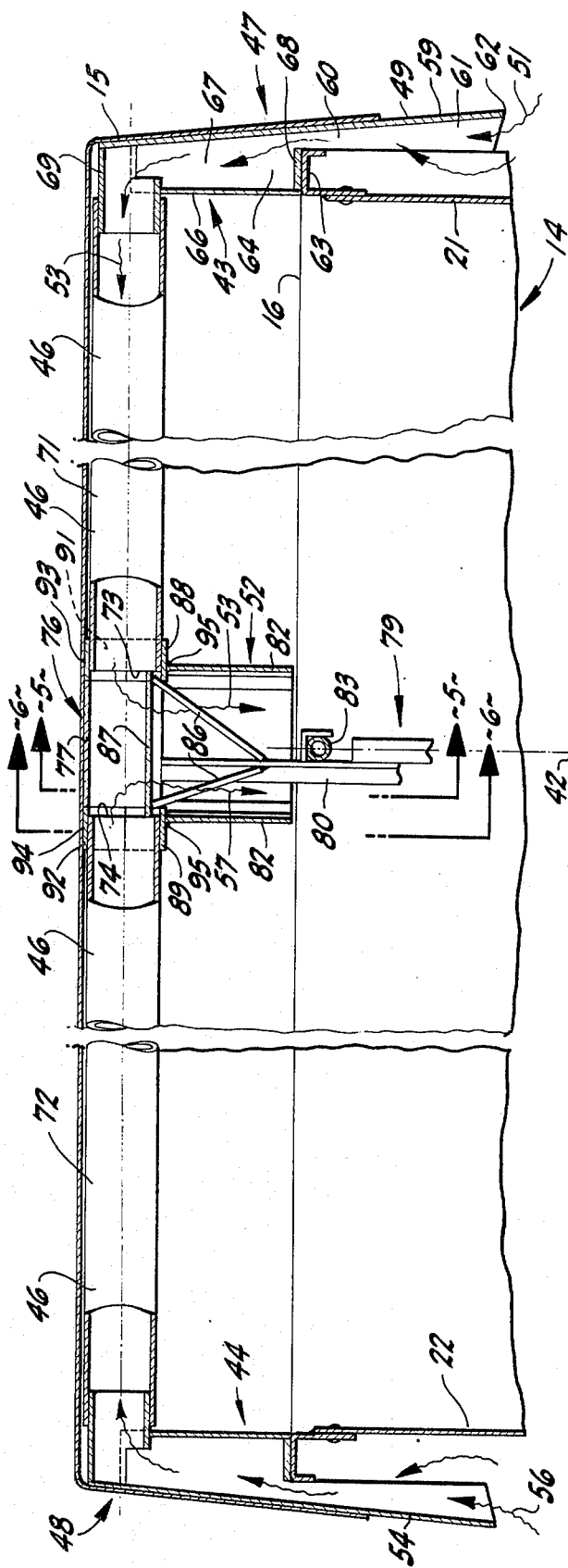
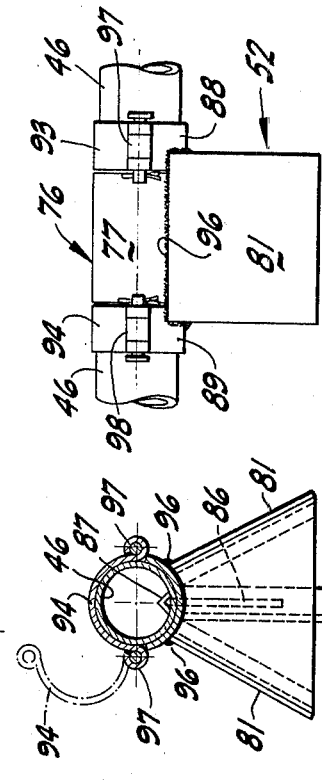
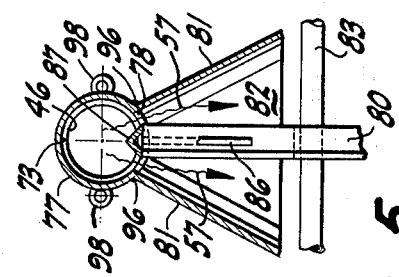

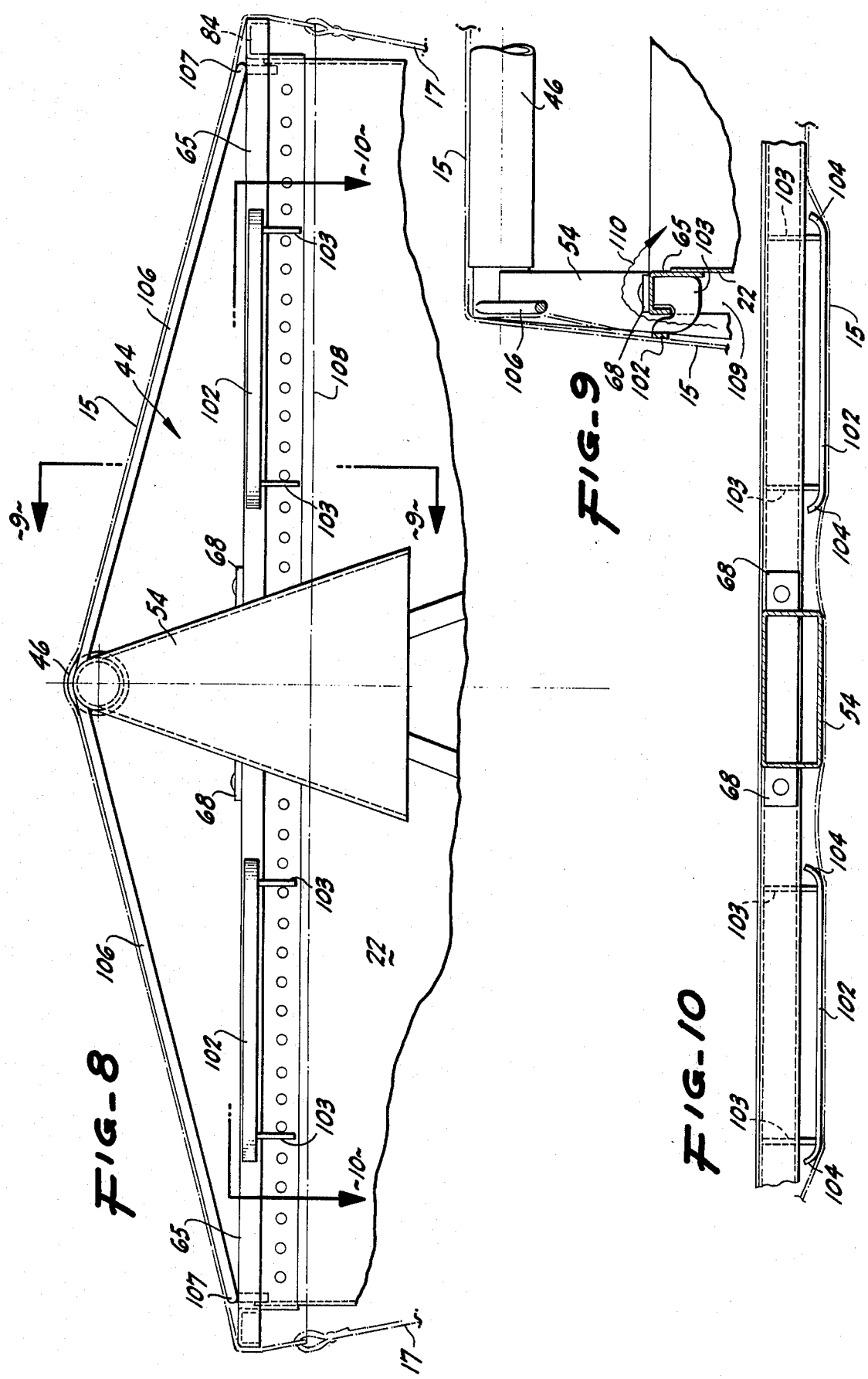

VACUUM RELIEF SYSTEM FOR TARPAULIN COVERED HOPPER TRAILERS

BACKGROUND OF THE INVENTION

In order to protect the contents of a hopper trailer from dust, rain, road spray, and the like, a tarpaulin is customarily secured around the rim of the hopper, the tarpaulin extending over the contents of the hopper so as to provide a cover. Frequently, a central fore and aft ridge pole is used to give a slope to the tarpaulin to shed rain and the like.

On a gravity discharge hopper trailer, the tarpaulin has heretofore had to be removed prior to unloading to avoid damaging the supporting ridge pole. The downward force exerted by atmospheric pressure on top of the tarpaulin as a crater at sub-atmospheric pressure forms in the underlying commodity during discharge is frequently great enough to rupture the tarpaulin or to fracture the ridge pole and the portions of the trailer to which the ridge pole is fastened.

In some installations, vents have been located along the upper sides and ends of the hopper in an endeavor to alleviate the problem created by the "vacuum" resulting from the crater formation vertically above the hopper door. This expedient suffers from two major flaws. One, since the vacuum forms in the central portion of the hopper and not around the upper margin of the hopper the vents around the periphery frequently have but little effet, particularly where the load is higher than the hopper rim. Two, the vents around the rim of the hopper have allowed rain, dust and road spray to enter the interior of the trailer, causing damage to the commodity.

SUMMARY OF THE INVENTION

The invention relates to a system for relieving the vacuum produced below a hopper trailer tarpaulin by the formation of a crater resulting from the removal of a commodity, and for accomplishing this result while preventing the entry of dust, moisture etc. into the trailer.

It is an object of the invention to provide a vacuum relief system for a tarpaulin covered hopper trailer which not only supports the portion of the tarpaulin extending over the trailer's contents but which forms the tarpaulin into the shape of a sloped roof, thereby facilitating the shedding of rain, dust, and the like.

It is another object of the invention to provide a vacuum relief system which is relatively compact and economical to install and maintain, yet is durable and has no moving parts to get out of order.

It is a further object of the invention to provide a vacuum relief system which obviates the necessity of removing the tarpaulin each time a covered hopper trailer is to be unloaded.

It is still a further object of the invention to provide a vacuum relief system which is continuously operable and effective regardless of the attention or lack of attention paid it by an operator.

It is yet a further object of the invention to provide a vacuum relief system which promotes the circulation of fresh air under the tarpaulin, thereby precluding the undesirable condensation of moisture on the covered commodity and thus preventing cargo spoilage caused by such condensation.

It is another object of the invention to provide a vacuum relief system which can be used not only on regular hopper trailers but also on widedoor hopper trailers.

It is additional object of the invention to provide a generally improved vacuum relief system for tarpaulin covered hopper trailers.

Other objects, together with the foregoing, are described in the following description and shown in the accompanying drawings.

BRIEF DESCRIPTION OF THE FIGURES

FIG. 4 is a fragmentary median, vertical, longitudinal section view, to an enlarged scale, of the ridge pole and nozzle, the plane of the section being indicated by the line 4 — 4 in FIG. 3;

FIG. 5 is a fragmentary, transverse sectional view of the nozzle structure taken on the plane indicated by the line 5 — 5 in FIG. 4;

FIG. 6 is a fragmentary, transverse sectional view of the nozzle taken on the plane indicated by the line 6 — 6 in FIG. 4, and illustrating in broken line the hinged pipe cap in open position;

FIG. 7 is a fragmentary side elevational view of the nozzle of FIG. 6, showing the hinged pipe cap in closed position;

FIG. 8 is a fragmentary rear-elevational view to an enlarged scale, of the hopper shown in FIG. 3, showing the gable orifice structure and the pair of tarpaulin rim spacers straddling the orifice;

FIG. 9 is a fragmentary sectional view taken on the plane indicated by the line 9 — 9 in FIG. 8; and, FIG. 10 is a fragmentary sectional view taken on the plane indicated by the line 10 — 10 in FIG. 8.

DETAILED DESCRIPTION OF PREFERRED EMBODIMENT

Figure 1:
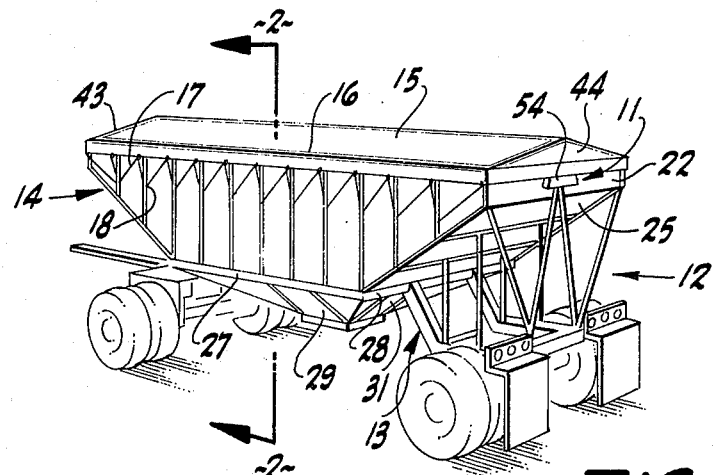
FIG. 1 is a left, rear, perspective view, to a considerably reduced scale, of a hopper trailer with a protective tarpaulin installed thereon, the trailer being provided with the present vacuum relief system.

While the vacuum relief system of the invention is susceptible of numerous physical embodiments, depending upon the environment and requirements of use, substantial numbers of the herein shown embodiments have been made, tested and used with many different sizes, shapes and kinds of hoppers, including conical shaped hoppers, and all have performed in an eminently satisfactory factory manner.

The vacuum relief system of the invention, generally designated by the reference numeral 11, finds especial utility in connection with a hopper trailer 12, including a trailer frame 13 and a hopper 14, covered by a tarpaulin 15 lashed to the upper margin 16 of the hopper 14 by suitable lines 17 and tie down hardware 18. It is clearly to be noted that where the term "tarpaulin" is used herein, both in the description and in the claims, it refers not only to the customary sheet of waterproofed canvas, or other flexible material, but also to a cover rigid material, such as aluminum or plywood.

The tarpaulin 15 serves as a protective cover for the contents of the hopper 14. In the case of a bottom discharge hopper trailer, such as the kind disclosed herein, the contents are often a commodity such as rice, wheat, oats, or other free running grains. It is of course to be realized that the cargo can consist of many different commodity classifications such as dry sand, gravel, poultry feed, pelletized animal foods and numerous other types of granular or pulverulent materials.

In many instances, the center portion of the commodity is piled higher than the level of the hopper upper margin 16 defined by the upper edges of the two hopper vertical side walls 19 and 20 and the two respective forward and after vertical end walls 21 and 22.

In order to guide the contents toward the hopper unloading door 23, a rearwardly and downwardly sloping bottom wall 24 extends from the lower edge of the forward end wall 21, and a forwardly and downwardly sloping bottom wall 25 extends from the lower edge of the vertical after end wall 22.

At the lower margins of the side walls 19 and 20 and the sloping bottom walls 24 and 25 the hopper is supported on a girth type frame 26 supported on the trailer chassis 13. The girth frame 26 comprises a pair of longitudinal side rails 27 and a pair of transverse end rails 28. The hopper extends downwardly through a well in the chassis and is detachably secured to the side rails 27. Such installations are well known and therefore require no detailed explanation.

In many hopper trailers a pair of inwardly and downwardly converging floor walls 29 depends from the side walls 19 and 20 and a pair of downwardly converging floor walls 31 depends from the respective bottom walls 24 and 25. In numerous types of hoppers, the converging floor walls 29 and 31 terminate in a horizontal plane and define a rectangular opening 33 selectively covered and uncovered by the hopper discharge door 23.

The contents of a hopper trailer can be unloaded in several different ways including gravity, gravity plus pneumatic means or by auger discharge. In the embodiment disclosed herein, the commodity is unloaded by gravity through the bottom door opening 33. The door 23 is conveniently translated between open and closed positions by suitable means, such as a rack and pinion sliding door mechanism (not shown). Such devices are well known and require no detailed explanation.

Figure 3:
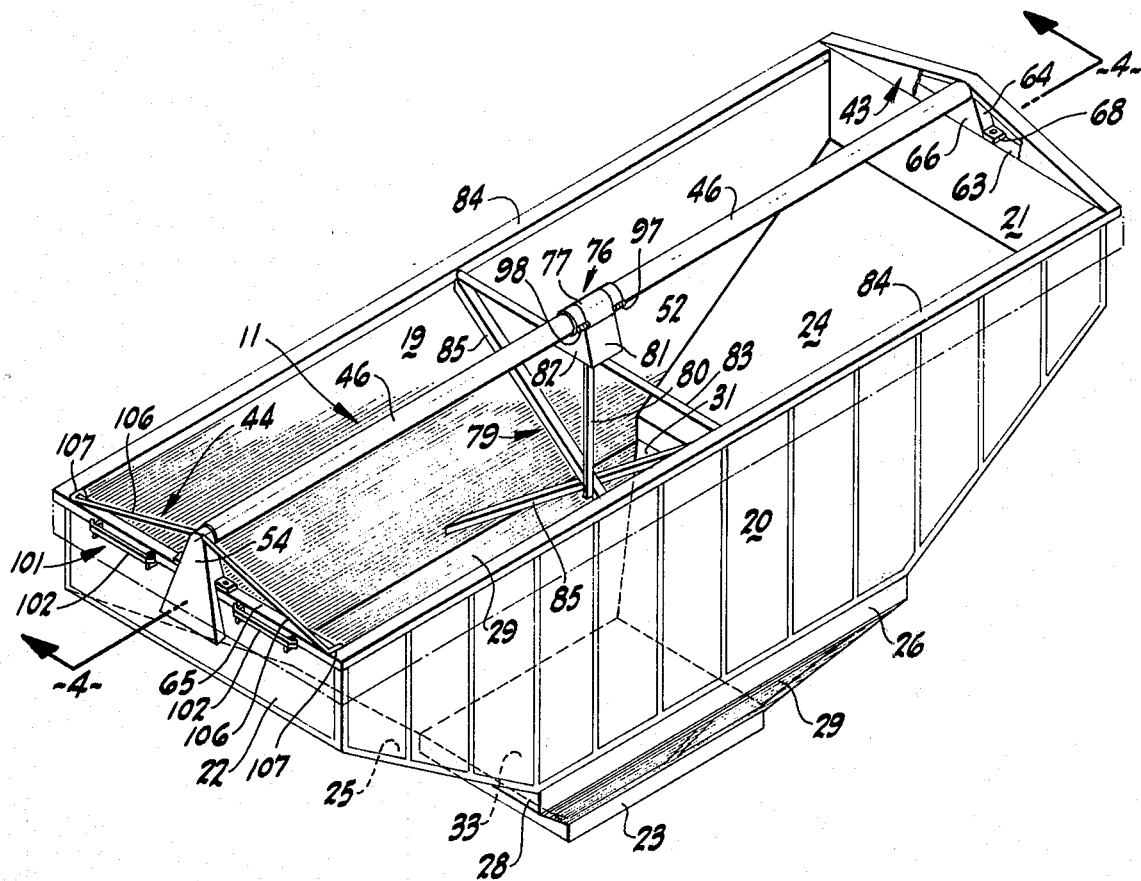
FIG. 3 is a right rear isometric view of the hopper portion only of a hopper trailer, with the tarpaulin removed to disclose details of the vacuum relief system, including a pair of tarpaulin spacers on the upper margin of the outer after wall of the hopper.

As appears most clearly in FIGS. 3 and 4, the hopper door opening 33 is customarily located in a central position, i.e. equidistant from the ends and sides of the hopper. Thus, when the hopper door 23 is opened so as to initiate unloading of the cargo 35, the contents immediately adjacent the door opening 33 are the first to emerge under the influence of gravity. As unloading proceeds, the portion of the cargo 35 vertically above the door opening 33 emerges prior to the emergence of the contents which are offset from a vertical axis 36 through the center of the door opening 33.

As a consequence, a crater 37, or depression, begins to form in the upper portion of the commodity 35, with the bottom 38 of the crater 37 located above the door opening 33. The crater lies substantially on the vertical axis 36. Reference numerals 37a–37c and 38a–38c illustrate progressive development of the crater 37.

In the usual case, the hopper is loaded so that the upper surface 39 of the commodity forms a mound extending upwardly above the level of the upper rim 16 of the hopper. The mound is highest where the median vertical longitudinal plane 41 and the transverse central plane 42 is approached, i.e. on the vertical axis 36.

Figure 2:
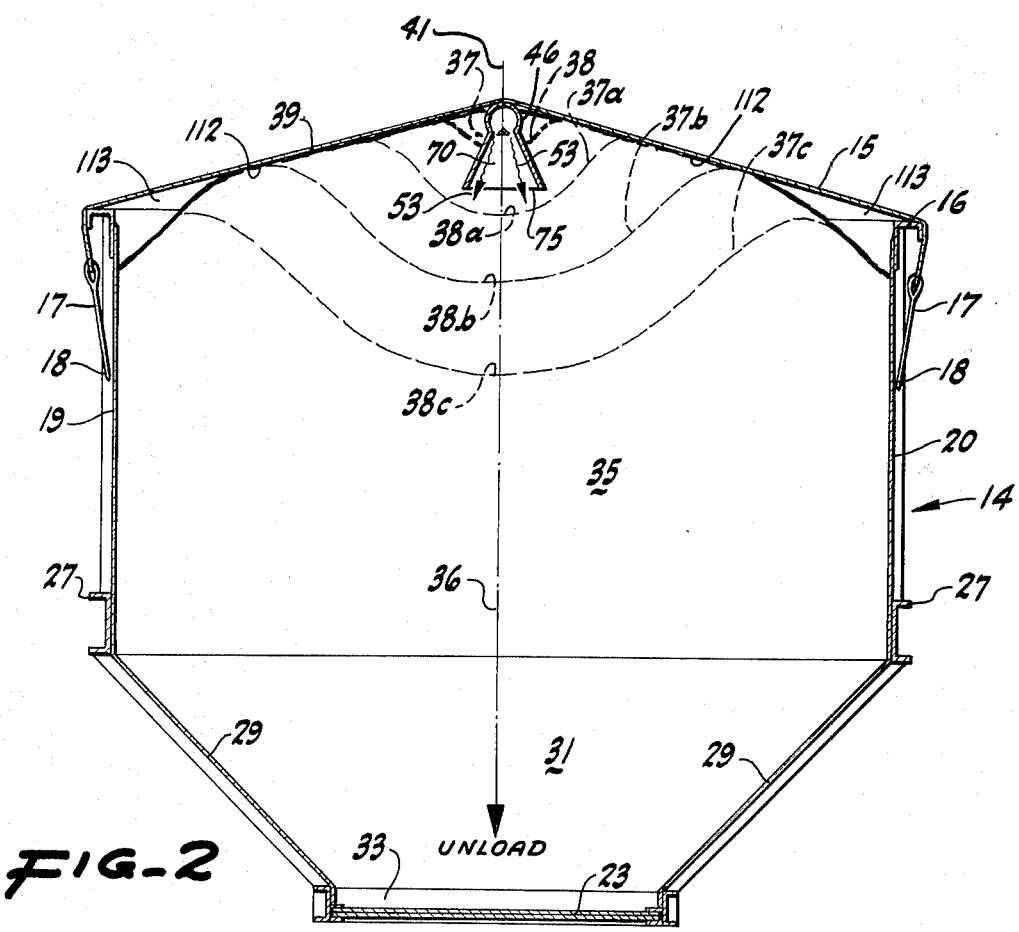
FIG. 2 is a fragmentary, vertical, transverse sectional view, to an enlarged scale, of the hopper portion of the trailer shown in FIG. 1, the plane of the section being indicated by the line 2 — 2 in FIG. 1, showing in unbroken line the initial contours of the contents and in broken line the successive outlines of a crater formed above the hopper door as unloading of the contents takes place.

Thus, when the tarpaulin 15 is tautly secured by the tie-down lines 17, as appears most clearly in FIG. 2, a tight seal is formed between the tarpaulin and the hopper rim 16. So also, the upper surface 39 of the contents 35 forms a relatively tight seal with the overlying tarpaulin 15 on each side of the vertical axis. In addition, a comparable sealing engagement takes place between the upper surface 39 of the cargo and the tarpaulin stretching toward the axis 36 from the forward end "gable" structure 43 and the after end gable structure 44.

Consequently, when the hopper door 23 is opened so as to start unloading the cargo 35, no atmospheric air is able to reach the steadily enlarging crater 37 (shown most clearly in broken line in FIG. 2) produced by the commodity discharging vertically below through the door opening 33 located on the vertical central axis 36.

The sub-atmospheric air pressure, or vacuum, existing in the crater 37 produces a significant pressure differential between the atmosphere and the region below the tarpaulin. This pressure differential, when multiplied by the area of the unsupported tarpaulin in the vicinity of the crater 37, produces a force which soon tends both to tear the tarpaulin fabric and to impose intolerable downward forces on the tarpaulin supporting structure. As the crater area increases the destructive forces mount.

In order to equalize the pressures on both sides of the tarpaulin in the vicinity of the crater, a sturdy hollow longitudinal ridge pole 46, spanning the two end gables 43 and 44, is provided. The ridge pole is constructed of strong hollow tubing, such as 4¼ inches outside diameter steel pipe having a wall thickness of 0.095 inches. The slope of the tarpaulin from the ridge pole downwardly to the two lateral upper rims 16 of the hopper 14 serves to shed water, accumulations of dust and the like.

It is clearly to be understood that the ridge pole 46 need not necessarily be installed in the median vertical longitudinal plane 41. It could, for example, be located vertically above the left-hand hopper side wall 19, to afford a shed-type "roof"; or above the right-hand side wall 20; or at intermediate locations. Preferably, however, the ridge pole 46 is symmetrically located, as shown.

By connecting the forward and after ends of the hollow ridge pole 46 to respective forward and after orifice structures 47 and 48, mounted on the gable supports 43 and 44, respectively, atmospheric air is able to enter both ends of the hollow ridge pole 46. At the forward end of the hopper, a forward conduit 49 receives atmospheric air flow as indicated by the arrow 51 (see FIG. 4). After vertically traversing the conduit 49, the air passes rearwardly through the hollow ridge pole 46, emerging downwardly through a nozzle 52 centrally located on the axis 36 vertically above the unloading door 23. Air flow in the nozzle from the forward conduit 49 is indicated by the arrow 53 as appears in FIGS. 2 and 4.

In like manner, atmospheric air enters the after conduit 54, as indicated by the arrow 56 in FIG. 4, the air traveling forwardly through the connecting hollow pipe 46, thence downwardly through the nozzle 52 and into the underlying crater 37, as indicated by the arrow 57 in FIG. 4.

The forward conduit 49 and the after conduit 54 are substantially identical and a description of one, for example, conduit 49, with serve also to describe the other.

The conduit 49 includes, in front elevation, a triangular cover plate 59 with a pair of inturned, fore and aft, triangular side plates 60 forming an upwardly converging passageway 61 for the flow of air. The lower end 62 of the conduit 49 is located considerably below the upper margin 16 of the hopper 14. Thus, an effective shield is provided against the entry of rain, snow, road spray and the like; yet air flow is not inhibited.

In the vicinity of the upper margin 16 of the forward transverse frame channel 63 (see FIG. 4 and the broken away portion of the forward gable 43 in FIG. 3) the inturned, fore and aft side plates 60 project rearwardly over the top of the frame channel 63 to form side walls 64 of rectangular shape. The after edges of the rearwardly projecting side wall portions 64 of the side plates 60 are covered by a triangular in rear elevation back plate 66. The back plate 66 forms, together with the side walls 64 and the cover plate 59 an upwardly converging funnel portion 67 of the conduit 47. The lower ends of the downwardly diverging side walls 64 flare laterally to form flanges 68 fastened to the channel 63, as by rivets (see FIG. 3).

Upon emerging from the top of the funnel 67 the air flows rearwardly through a transition fitting 69, thence into the hollow tube 46 and rearwardly to the nozzle 52, as previously explained.

The nozzle structure 52 is interposed between the forward portion 71 of the hollow ridge pole 46 and the after portion 72 thereof. That is to say, the ridge pole pipe 46 is divided into two parts with the nozzle 52 interposed between the adjacent but separated pipe ends 73 and 74.

The adjacent but separated ends 73 and 74 of the two pipe sections are connected by a coupling 76 comprising a pipe bridge 77 having a length slightly less than the distance between the facing ends 73 and 74. The inside diameter of the pipe bridge 77 is substantially the same as the outside diameter of the ridge pole pipe 46, as appears in FIGS. 4 and 5.

The lower, approximately 60° of arc of the bridge, or coupling, pipe 77 is removed to afford a downwardly facing opening 78 for the flow of air. The path of air flow is indicated by the arrows 53 and 57, the air passing downwardly through the nozzle passageway 70 defined by the flaring side walls 81 and vertical end walls 82 of the nozzle 52 and emerging through the nozzle outlet 75 into the crater 37 (see FIG. 2).

The nozzle 52 and the two adjacent ends 73 and 74 of the ridge pole pipe 46 are supported by a sturdy framework 79 including a vertical post 80 mounted adjacent the upper end on a cross-bar 83 spanning the opposite longitudinal upper frame channels 84 of the hopper 14. The lower end of the vertical post 80 is secured to the intersection of a pair of X-braces 85, or angle braces (see FIG. 3).

Mounted adjacent the upper end of the vertical post 80 is a pair of struts 86 (see FIG. 4) diverging upwardly and supporting a fore and aft rib connector, 87 of angle iron (FIGS. 4-6). The top of the post 80 also supports the rib connector 87 directly by being welded thereto.

The forward and after ends of the rib connector 87, in turn are secured to and support the lower halves 88 and 89 of a respective pair of forward and after split collars 91 and 92. The upper halves of the slipt collars 91 and 92, which are also termed pipe caps, are designated by the respective reference numerals 93 and 94.

The split collars 91 and 92 are of the same cross-section as the coupling pipe 77 and the collars abut the ends of the pipe 77, as appears most clearly in FIGS. 4 and 7.

So also, the split collars 91 and 92 have an inside diameter substantially equal to the outside diameter of the ridge pole pipe 46. Thus, when the upper halves 93 and 94 of the split collars are closed, as in full line in FIGS. 4-6, the enclosed ends 73 and 74 of the ridge pole pipe 46 are snugly clamped in place.

As appears most clearly in FIG. 4, the transverse vertical end walls 82 of the nozzle 52 are welded to the lower halves 88 and 89 of the split collars 91 and 92, as by weldments 95; and as shown in FIGS. 5-7, the upper ends of the two flaring side walls 81 of the nozzle 52 are welded to the lower halves 88 and 89 of the split collars 91 and 92, as well as to the lower portion of the bridge pipe 77, as by weldments 96.

The respective upper halves 93 and 94 of the split collars 91 and 92 are clamped over the underlying ends 73 and 74 of the ridge pole pipe 46 and are held in place by a respective pair of forward and after hinge pairs 97 and 98 (see FIGS. 3, 5, 6 and 7).

To summarize the supporting structure for the nozzle 52 and the two adjacent ends 73 and 74 of the ridge pole pipe 46, the vertical post 80 supports at its upper end the fore and aft reinforcing angle iron rib connector 87. The lower portions of the forward and after ends of the rib connector 87 are secured, by welding, to the lower halves 88 and 89 of the respective split collars 91 and 92. It is to be noted, incidentally, that the length of the rib connector 87 is slightly less than the distance separating the facing ends 73 and 74 of the ridge pole pipe 46, just as the length of the coupling pipe 77 is slightly less than the distance between the collars 91 and 92. Assembly of the parts is thereby facilitated.

The lower halves 88 and 89 of the split collars 91 and 92 serve as cradle supports for the respective two ends 73 and 74 of the ridge pole 46.

The briding pipe 77 which closes the gap between the gap between the spaced ends 73 and 74 of the ridge pole carries no appreciable load and serves for the most part as a conductor for the air flow emerging from the pipe ends 73 and 74. The briding pipe 77 is thus conveniently supported by the two flared side walls 81 of the nozzle through weldments 96 (see FIGS. 5-7). The nozzle 52 is also of rather light weight and, as indicated above, is supported by weldments 95 to the lower, cradle-shaped halves 88 and 89 of the respective split collars 91 and 92. As appears most clearly in FIGS. 6 and 7, the forward and after upper corners of the flared side walls 81 of the nozzle 52 are also secured to the lower halves 88 and 89 by weldments 96.

The hinged upper halves 93 and 94, or pipe caps, rigidly clamp the entire structure when in use; yet, when the pipe caps are open, as shown in broken line in FIG. 6, assembly and disassembly are readily effected.

Where the unloading doors are of the types shown in FIGS. 1-3, i.e. where the door opening is of the usual 24 by 24 inch size, the vacuum relief system heretofore described serves in an entirely satisfactory fashion.

However, some hopper trailers are of the so-called "wide-door" variety in which the opening 33 is often either 24 by 84 inch or 24 by 92 inch. In the case of very wide doors, the laterally sloping floors 29 do not exist. Instead, the side walls 19 and 20 continue vertically downwardly to door level, although the two downwardly converging floor walls 31 are substantially the same as previously described.

One of the important features of a wide-door type of trailer is that the rate of commodity discharge is very rapid.

A secondary vacuum relief system, generally designated by the reference numeral 101 (see FIGS. 3 and 8-10), is thus preferably utilized in the case of wide door hopper trailers. However, some operators like to use the secondary system 101 in addition to the primary system 11 even on trailers with smaller discharge doors in order to improve the interior ventilation when hauling certain commodities. FIG. 3, in fact, illustrates such an arrangement.

The secondary system 101 utilizes a pair of spacer bars 102 located on the after wall 22 of the hopper 14 adjacent the upper after transverse frame channel 65 and on opposite lateral sides of the rear conduit 54. The spacer bars 102 are each supported by a pair of brackets 103 mounted on the frame channel 65 and the ends of the spacer bars 102 are arcuately curved as at 104 to avoid catching the fabric of the tarpaulin 15 (see FIG. 10).

Thus, at the after gable end 44 of the hopper trailer, the tarpaulin 15 is supported on the median fore and aft plane 41 by the ridge pole 46 and transversely by a pair of laterally downwardly sloping brace rods 106 which extend from the after end of the ridge pole 46 to the corners 107 where the longitudinal upper frame channels 84 meet the after, transverse, upper frame channel 65.

The two spacer bars 102 hold the taut tarpaulin outwardly away from the upper after wall 22 of the hopper a sufficient distance so that even though the bottom margin 108 of the tarpaulin is located below the spacer bars 102, nevertheless a channel 109 (see FIG. 9) is provided for the upward and inward flow of air as indicated by the arrow 110, the channel 109 being defined by the after wall 22 and the tarpaulin 15.

Since the secondary system 101 is located high and on the after wall only of the hopper, no rain, snow, road spray, or other deleterious material is entrained in the flow, either while the vehicle is moving or when it has stopped and is being unloaded.

It is to be noted as a matter of interest that the secondary system 101 enhances the forced ventilation provided by the primary system 11 while the vehicle is in motion.

The operation of the secondary vacuum relief system coordinates with the primary relief system in the following manner.

When unloading is initiated, the crater 37 forms in the immediate vicinity of the nozzle 52, and as previously explained, the crater expands in volume as indicated by the successive alphanumerals 37a through 37c.

During the time the rim of the crater 37 is still in sealing engagement with the overlying tarpaulin 15 (as in positions 37, 37a, and 37b in FIG. 2) air inflow through the relief orifices 47 and 48 and through the ridge pole pipe 46 and nozzle 52 is at a substantial velocity so as to equalize the air pressure within the rapidly enlarging crater.

If the unloading door 23 is relatively small in size, the rate of enlargement of the crater 37 is limited in extend; and, in fact, when the seal of the commodity surface 39 is broken as at 112 in FIG. 2, corresponding to crater configuration 37b, the rate of cargo outflow is such that the primary vacuum relief system can readily cope with the pressure equalization problem.

Where, however, the commodity is discharging through a wide-door opening, the rate of commodity discharge is so great that when the seal is broken as at 112 in FIG. 2 (assuming the opening 33 in FIG. 2 is of the wide-door type, rather than the regular kind, as shown) serious destructive forces could be applied to tarpaulin and ridge pole alike owing to the large area involved. The inflow of air through the primary system under some commodity load conditions may not suffice.

The secondary vacuum relief system 101 overcomes the problem by affording copious air flow 110 to the peripheral channel 113 (see FIG. 2) between the commodity surface 39 and the hopper's upper margin 16, the channel 113 ordinarily extending around the entire upper rim of the hopper.

Thus, when the seal 112 breaks as crater configuration 37b descends so as to assume configuration 37c, for example, atmospheric air is vented to the interior not only through the nozzle 52 but also directly through the dual channels 109 on the after upper end of the hopper.

It can therefore be seen that a vacuum relief system is provided which not only protects both tarpaulin and ridge pole on all types of hopper trailers, but which also gives forced air circulation when the vehicle is in transit and which accomplishes these beneficial results without the introduction of rain, road spray and the like onto the commodity to be protected.

What is claimed is:

1. Vacuum relief system for hopper trailer having opposing end walls and opposing side walls defining a horizontal upper rim, a bottom including a cargo discharge door, and a tarpaulin covering the trailer hopper and extending around the upper rim in substantially air tight relation thereto, said system comprising:
    a. an elongated hollow tube;
    b. means for mounting said tube on the opposing end walls of the hopper at an elevation above the level of the upper rim, said tube extending the entire distance between the end walls and being located below and in supporting relation to the tarpaulin to elevate the same above the level of the upper rim;
    c. orifice means mounted on the hopper and connected to said tube for establishing communication between the atmosphere and said tube; and,
    d. nozzle means on said tube for venting atmospheric air from said tube to a location below the tarpaulin, said tube being effective to conduct atmospheric air from said orifice means to a space between the tarpaulin and the subjacent contents of the hopper to equalize the air pressures on both sides of the tarpaulin as the contents of the hopper are withdrawn through the cargo discharge door.

2. A vacuum relief system as in claim 1 in which said nozzle means and the cargo discharge door are in substantially vertical alignment.

3. A vacuum relief system as in claim 2 in which said nozzle means is located substantially mid way between the ends of said tube, and in which a pair of said orifice means is connected to the ends of said tube.

4. Vacuum relief system for tarpaulin covered hopper trailer having cargo-confining side, forward and after end walls providing a horizontal upper rim and floor walls defining a bottom opening selectively covered and uncovered by a hopper discharge door, said system comprising:
 a. an elongated hollow tube;
 b. means for mounting said tube on said trailer with at least a portion of said tube overlying the trailer hopper in a position to underlie and support a tarpaulin extending around the upper rim of said hopper in substantially air tight relation and covering the hopper cargo, said tube mounting means including support members mounted on the forward and after end walls and lying in a median vertical longitudinal plane extending through said hopper, said support members including top portions projecting above the level of the upper rim,
  said tube being mounted on said top
  portions and extending therebetween
  to provide a central ridge pole capable
  of supporting the longitudinally central
  portion of the tarpaulin at an elevation
  above the level of the upper rim;
 c. orifice means mounted on said hopper and connected to said tube for establishing communication between the atmosphere and said tube; and,
 d. means located on said tube for venting air from said tube to a location below the tarpaulin, said tube being capable of conducting atmospheric air from said orifice means to a space between the tarpaulin and the subjacent contents of said hopper to equalize the air pressure on both sides of the tarpaulin as the contents are withdrawn from said hopper.

5. Vacuum relief system as in claim 4 in which said orifice means includes conduits mounted on said support members, said conduits extending upwardly from an air intake port located at an elevation below said upper rim level to an air discharge port located adjacent said top portions of said support members.

6. Vacuum relief system as in claim 5 in which said venting means includes an opening in said tube intermediate the ends of said tube, and an air nozzle covering said opening and projecting downwardly toward said contents of said hopper.

7. Vacuum relief system as in claim 6 in which said nozzle is vertically above the hopper door.

8. Vacuum relief system as in claim 4 including tarpaulin spacing means mounted on the after wall of said trailer below said upper rim of said hopper and interposed between said tarpaulin and said after wall for separating said tarpaulin from said after wall to equalize the air pressure inside said hopper in the vicinity of said upper rim and outside said tarpaulin.

9. Vacuum relief system as in claim 8 wherein said spacing means includes a bar, and means for mounting said bar on said after wall in spaced relation thereto.

10. Vacuum relief system as in claim 9 in which there are two of said bars one of said bars being located on said after wall on each lateral side of the after one of said support members.

* * * * *